April 23, 1968     L. B. LEONARD     3,379,217

CAPILLARY PASSAGE AND METHOD OF MAKING

Filed Sept. 24, 1963

INVENTOR.

LYNN B. LEONARD

BY

ATTORNEY

United States Patent Office 3,379,217
Patented Apr. 23, 1968

3,379,217
CAPILLARY PASSAGE AND METHOD
OF MAKING
Lynn B. Leonard, Fullerton, Calif., assignor to Beckman Instruments, Inc., a corporation of California
Filed Sept. 24, 1963, Ser. No. 311,185
16 Claims. (Cl. 138—44)

This invention relates to a capillary passage and, more particularly, to a very small, precise capillary passage and to the method for making the same.

There is frequently required in a variety of scientific applications and instruments very small capillary passages having precise dimensions. The conventional method of forming capillary passages in glass members is to use either the hot wire method, which involves heating a tungsten wire and inserting it into the wall of a glass member, or to use a very small drill. Both of these methods have distinct disadvantages and are limited in their ability to form very small and precise capillary passages. In both of the above methods, it is extremely difficult to hold the hot wire or drill in an exact position so that a precise, straight passage may be formed in a glass body. Moreover, if a passage of a diameter of about .0005 inch is desired, it is virtually impossible to provide tungsten wires or drills of that diameter which could be practically used for forming capillary passages. A tungsten wire has still a further disadvantage in that it tends to burn up when heated and thus reduces in diameter. Therefore, if the same wire is continuously used to provide a series of capillary passages, uniform size capillary passages cannot be obtained.

It is the principal object of the present invention to provide a method for forming a very small, precise capillary passage in a glass body.

A further object of the invention is to provide a very simple and inexpensive means for providing in a glass body a capillary passage of very small dimensions heretofore unobtainable.

Still a further object of the invention is to provide a reinforced capillary tube having a controlled inner diameter throughout the length thereof of very small dimension.

According to the principal aspect of the present invention, a very small capillary passage is formed in a glass body by first providing a very small capillary tube of a first glass material and then inserting the tube into a passage in the glass body having a lower softening temperature than the capillary tube. The term "glass body" as used herein shall be understood to mean a wall or mass of glass of any shape and size into which it is desired to provide a small capillary passage. The glass body is heated in the area adjacent to the capillary tube to the softening temperature of the glass body to collapse and seal the glass body upon the capillary tube, thereby providing a capillary passage within the glass body. This method provides a means for quickly and easily producing precise capillary passages in glass bodies.

A secondary aspect of the present invention is to provide a capillary tube having a passage therein of very small and precise diameter by utilizing the general method stated above. In this embodiment, a very small capillary tube of a first glass material is inserted into a second tube having a lower softening temperature than the capillary tube. The second tube is heated to its softening temperature to collapse and seal the tube upon the capillary tube thereby providing a capillary tube of very small and precise internal diameter but which has sufficient strength to be handled in a normal manner.

Other objects, aspects and advantages will become apparent from the following description taken in connection with the accompanying drawing wherein.

Figure 1:
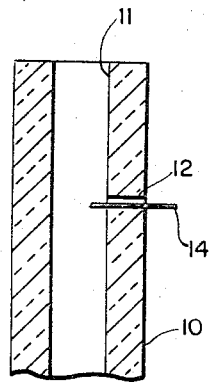
FIG. 1 is a longitudinal sectional view of a glass body, greatly enlarged, having a passage therein with a capillary tube loosely positioned in the passage.

Referring now to FIG. 1 of the drawing, there is illustrated a glass body in the form of a cylindrical glass tube 10 having a longitudinal passage 11 and a lateral passage 12 extending through the wall of the tube which is the point at which it is desired to provide a very small, precise capillary passage. The passage 12 may be formed by using a hot wire method or by utilizing a conventional drill. To provide a very small capillary passage within the lateral passage 12, there is selected a stock tube of glass, for example, a high silica glass of any convenient diameter and length. This tube is then reduced to a desired diameter by first heating the tube to its working temperature and then drawing the tube in a conventional way. Capillary tubes may be drawn down to very small sizes, for example, having outer diameters of about .001 inch and inner diameters of about .0005 inch or less. After drawing down the high silica glass tube, a small section may be broken off, and the section of the capillary tube 14 is then inserted into the passage 12 in the wall of the glass body 10.

Figure 2:
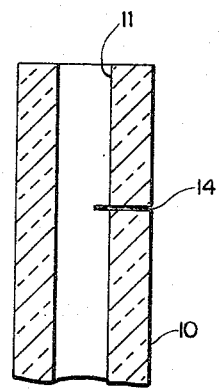
FIG. 2 is an enlarged longitudinal sectional view of the glass body shown in FIG. 1 with the body collapsed and sealed to the capillary tube.

It is essential to the invention that the glass body has a lower softening point or softening temperature than the capillary tube 14. Preferably, the softening temperature of a capillary tube should be around 200° C. or greater than the softening temperature of the glass body. After inserting the capillary tube into the passage 12 the glass body is heated to its softening temperature by means such as a torch, not shown, to collapse and seal the glass of the body adjacent the tube upon the capillary tube as shown in FIG. 2. The outer end of the capillary tube may be broken off flush with the side of the wall of the glass body 10 to provide a finished assembly.

By way of example but not by limitation, a capillary passage has been formed in a glass body as shown in FIGS. 1 and 2 by selecting a high silica glass, "Vycor," for the glass of the capillary tube, which is Corning's No. 7900 fused silica glass containing about 96 percent silica. The softening point of this glass is about 1500° C. and it has a coefficient of expansion of about $8 \times 10^{-7}$ inches per degree centigrade. As the glass body 10, there was selected a borosilicate glass, commonly known as "Pyrex," which is Corning's No. 7740 borosilicate glass having a softening point of about 820° C. and a coefficient of expansion of about $32.5 \times 10^{-7}$ inches per degree centigrade. The "Vycor" capillary tube was drawn down from a molten state to a very small capillary tube having a .0005 inch inner diameter and about a .0015 inch outer diameter. After selecting a predetermined length of "Vycor" capillary tube, the tube was inserted into the opening 12 of the "Pyrex" glass body and the glass of the body 10 adjacent the capillary tube 14 was heated by a torch flame until the glass of the body surrounding the tube collapsed and was sealed to the capillary tube 14.

Although the specific example of how to form a capillary passage in a glass wall described above uses a borosilicate glass and a vitreous silica glass, glasses other than those specifically stated may be used if the outer glass body has a lower softening temperature than the inner capillary tube 14. For example, the borosilicate glass tube may be replaced by a lead glass such as Corning's No. 0010 potash soda lead glass which has a softening temperature of 625° C. In such a case, the capillary tube 14 may be formed of "Pyrex" which has a softening temperature of about 200° C. higher than the softening temperature of the lead glass. If the difference between the softening temperatures of the two glasses becomes lower than about 200° C., then it is far more difficult to cause the sealing of the two glasses by heating the outer glass body.

One factor to consider in practicing the present invention is that the thickness of the glass surrounding the capillary tube 14 should be sufficient so that the glass does not crack when it collapses upon cooling onto the capillary tube 14 due to tension forces which result in the glass. It has been found that for easy formation of capillary passages, the ratio of the thickness of the outer glass body surrounding the capillary tube 14 to the thickness of the wall of the capillary tube should be about 4:1 or greater to prevent cracking of the glass body. However, if care and skill are exercised, it is expected that cracking will not occur if the ratio is greater than 1:1. If the thickness of the glass body 10 is less than the thickness of the capillary tube 14, the glass body most likely will crack when it collapses upon cooling. If the glass body is sufficiently thick, as defined by the ratios stated above, sufficient glass surrounds that portion of the glass body which collapses upon the capillary tube to prevent cracks caused by tension forces.

The present invention is also useful for forming mechanically rugged reinforced capillary tubes which may be heated and applied to other glass members as desired. Very small capillary tubes of high silica glass may be formed by using conventional drawing methods as described above with respect to the method of forming the capillary tube 14. However, these tubes have the obvious disadvantage that they are extremely fragile and are not suitable for use in handling by other than the most careful micro manipulator methods. Capillary tubes may be formed of materials other than high silica glass as, for example, "Pyrex," with small internal diameters but such tubes have the disadvantage that when they are heated to apply to another glass member or heated to bend, the capillary passage may be closed off by the high temperatures required to fuse or deform the capillary tube. The present invention provides a means by which a capillary tube may be provided with a very small, precise internal diameter which is rugged and, therefore, can withstand normal handling. The tube also may be fused to other glass members, or bent without closing the capillary passage. Thus, the capillary tube of the present invention overcomes both of the disadvantages of the two types of glass capillary tubes described above.

Figure 3:
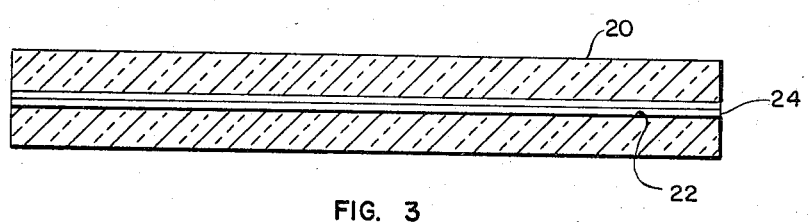
FIG. 3 is a fragmentary longitudinal sectional view, greatly enlarged, of a capillary tube formed in accordance with the novel features of the present invention.

Reinforced capillary tubes utilizing the method of the present invention may be formed by providing a glass tube 20 having a passage therethrough 22 into which there is positioned a very small capillary tube 24 having a smaller outer diameter than the diameter of the passage 22 and having a higher softening temperature than the softening temperature of tube 20. As in the device illustrated in FIG. 1, the glass tube 20 is heated by a flame, or the like, until its softening temperature is reached thereby collapsing the tube 20 onto the capillary tube 24 to seal the two members together, as illustrated in FIG. 3 of the drawing. Thus, there is provided a reinforced capillary tube which has much greater strength than the inner capillary tube 24 alone and, thus, may be handled in a conventional manner and has the advantage that it may be bent or sealed to other glass members by heating without closing off the ends of the capillary tube.

It may be appreciated that this aspect of the invention is not limited to capillary tubes in which the outer tube is sealed along its entire length to the inner capillary tube as shown in FIG. 3. For example, it is possible that by controlling the point where heat is applied to the assembly, that the inner and outer tubes need only be sealed at specific points, such as at the ends of the tubes, thus leaving the inner capillary tube suspended within the passage in the outer tube. The choice of materials used for the inner and outer glass tubes 24 and 20, respectively, of the reinforced capillary tube structure illustrated in FIG. 3 is the same as the materials used in the structure shown in FIG. 1. Also, it is best that the ratio of the thickness of the wall of the outer tube 20 to the thickness of the wall of the capillary tube 24 be greater than 1:1.

Figure 4:
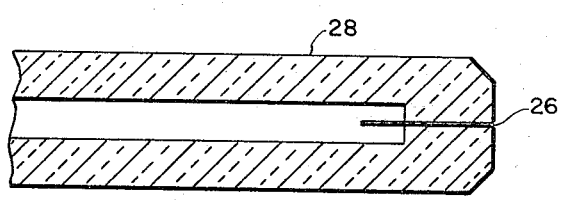
FIG. 4 is an enlarged longitudinal sectional view of an additional embodiment of the present invention.

A further example of an application of the present invention is to form a capillary leak structure for reference electrodes used in electrochemical measurements. This is best seen in FIG. 4 in which the leak structure is formed by using the method described above with respect to capillary tubes, but there is provided only a short inner capillary tube 26 of high silica glass or the like which is inserted at one end of the enlarged outer tube 28 of a glass having a lower softening temperature than the high silica glass. The outer tube is then heated at the one end to its softening temperature to collapse the tube down upon the inner capillary tube 26. Thus, there is provided at the end of the tube 28 a small leak passage for fluid contained within the tube 28. The structure shown in FIG. 4 has been used as an electrolytic leak structure for saturated potassium chloride solution. At 25° C., this structure with a capillary of 5 millimeters length exhibited a D.C. electrical resistance of 180,000 ohms. The rate of flow under a head of about 6 inches of water was found to be on the order of 1 milliliter in 72 hours. Thus, it is seen that this structure is extremely useful for leak structures.

Still a further application of the invention is to provide a capillary passage of controlled dimensions of length and diameter for a precision leak for gases.

Although several embodiments of the invention have been disclosed herein for purposes of illustration, it will be understood that various changes can be made in the form, details, arrangement and proportions of the various parts in such embodiments and in the choice of glass materials used in the several parts without departing from the spirit and scope of the invention as defined by the appended claims.

What is claimed is:
1. In combination:
   an elongated glass capillary tube;
   a body of glass having a passage therethrough no longer than said capillary tube and having a lower softening temperature than said capillary tube; and
   said capillary tube being positioned lengthwise in said passage with each end of said capillary tube extending to at least each respective end of said passage and said capillary tube having its outer walls sealed to the walls of said passage.
2. The combination as set forth in claim 1 wherein the ratio of the thickness of said glass body surrounding said capillary tube to the thickness of the wall of said capillary tube is greater than 1:1.
3. The combination as set forth in claim 1 wherein the softening temperature of said capillary tube is about 200° C. or greater than the softening temperature of said body of glass.
4. A reinforced capillary tube comprising:
   an elongated glass capillary tube;
   a second elongated glass tube having a passage therethrough no longer than said capillary tube, said second tube having a lower softening temperature and greater coefficient of expansion than said capillary tube; and said capillary tube being positioned lengthwise in the passage in said second tube with each end of said capillary tube extending to at least each respective end of said passage and said capillary tube having its outer walls sealed to the walls of said passage in said second capillary tube.

5. A reinforced capillary tube as set forth in claim 4 wherein the ratio of the thickness of the wall of said second tube to the thickness of the wall of said capillary tube is greater than 1:1.

6. A reinforced capillary tube comprising:
an elongated glass capillary tube;
a second glass tube having an inner diameter larger than the outer diameter of said capillary tube except for a portion thereof, said portion of said second tube being no longer than said capillary tube;
said capillary tube being positioned lengthwise in said portion of said second tube with each end of said capillary tube extending to at least each respective end of said portion of said second tube, and said portion of said second tube being sealed to the outer wall of said capillary tube; and
said second glass tube having a lower softening temperature than said capillary tube.

7. The method of forming a capillary passage in a body of glass comprising the steps of:
providing an elongated glass capillary tube;
providing a body of glass having a passage therethrough no longer than said capillary tube and of larger cross-sectional area than said capillary tube, said body having a lower softening temperature than said capillary tube;
inserting said capillary tube lengthwise in said passage with each end of said capillary tube extending to at least each respective end of said passage; and
heating said body of glass adjacent said tube to the softening temperature of said body whereby said body will collapse and seal onto said capillary tube upon cooling.

8. The method as set forth in claim 7 wherein said glass capillary tube has an inner diameter of about .0005 inch or less and is formed by heating and drawing down a larger diameter capillary tube.

9. The method as set forth in claim 7 wherein the softening temperature of said glass capillary tube is about 1500° C. and the softening temperature of said body of glass is about 820° C.

10. The method as set forth in claim 7 wherein the softening temperature of said capillary tube is about 200° C. or greater than the softening temperature of said body of glass.

11. The method as set forth in claim 7 wherein the ratio of the thickness of the glass body surrounding said capillary tube to the thickness of the wall of the capillary tube in the final assembly is greater than 1:1.

12. The method as set forth in claim 11 wherein said capillary tube is formed of a high silica glass and said glass body is formed of a borosilicate glass.

13. The method of forming a precise capillary passage in a body of glass comprising the steps of:
providing an elongated glass capillary tube of a desired dimension;
providing a body of glass having a lower softening temperature than said capillary tube;
forming a passage through said body of glass no longer than said capillary tube and of larger cross-sectional area than said capillary tube;
inserting said capillary tube lengthwise in said passage with each end of said capillary tube extending to at least each respective end of said passage; and
heating said body of glass adjacent said tube to the softening temperature of said body whereby said body will collapse and seal onto said capillary tube upon cooling.

14. The method as set forth in claim 13 wherein said capillary tube is formed of a high silica glass and said glass body is formed of a borosilicate glass.

15. The method of forming a capillary tube comprising the steps of:
providing an elongated glass capillary tube;
providing a second glass tube having a longitudinal passage therethrough no longer than said capillary tube and of larger cross-sectional area than said capillary tube, said second tube having a lower softening temperature than said capillary tube;
inserting said capillary tube lengthwise in said passage with each end of said capillary tube extending to at least each respective end of said passage; and
heating the second tube to its softening temperature whereby said second tube will collapse and seal onto said capillary tube upon cooling.

16. The method as set forth in claim 15 wherein the ratio of the thickness of the wall of said second tube to the thickness of the wall of said capillary tube in the final assembly is greater than 1:1.

References Cited
UNITED STATES PATENTS 3,122,431    2/1964    Coulter et al. _____ 156—303.1 X
2,925,370    2/1960    Rohrer _____ 65—61 X DONALL H. SYLVESTER, *Primary Examiner.*

G. R. MYERS, R. L. LINDSAY, *Examiners.*